Dec. 28, 1965    G. B. STRACCA    3,226,659
FERRIMAGNETIC CIRCULATOR FOR MICROWAVES
Filed July 25, 1962    5 Sheets-Sheet 1

INVENTOR.
Giovanni B. Stracca
BY
Atty.

Dec. 28, 1965  G. B. STRACCA  3,226,659
FERRIMAGNETIC CIRCULATOR FOR MICROWAVES
Filed July 25, 1962  5 Sheets-Sheet 3

INVENTOR.
Giovanni B. Stracca

INVENTOR.
Giovanni B. Stracca

United States Patent Office 3,226,659
Patented Dec. 28, 1965

3,226,659
FERRIMAGNETIC CIRCULATOR FOR MICROWAVES
Giovanni B. Stracca, Milan, Italy, assignor to Marelli Lenkurt S.p.A., Milan, Italy
Filed July 25, 1962, Ser. No. 212,288
6 Claims. (Cl. 333—1.1)

The present invention relates to a non-reciprocal circuit for microwaves, and in particular to a non-reciprocal junction between transmission lines, known by the name of "circulator."

It is an object of the present invention to provide a structure for a circulator, functioning even in the lowest part of the scale of the microwave frequencies, with lines employed in the principal mode, so as to obtain structures of exteme compactness. A second object is that of obtaining an unusually broad operating band.

For purposes of clarification the principal mode as referred to many times in the application, will be used to denote any propagating mode having a cutoff frequency equal to zero. Thus for example, coaxial lines and strip lines employed in the TEM mode are under this description being used in the principal mode of propagation.

In the description of the device, reference will be made, for simplicity and greater clearness, to a non-reciprocal junction between three transmission lines, although the ideas divulged may be easily extended also, by anyone skilled in the art, to more complicated junctions between more than three transmission lines. By the expression "transmission line" is means here, in a general way, any transmission line used for microwave frequencies, that is, either those used in the principal mode of propagation, if it can be propagated (including for example transmission lines employed in the TEM mode, such as coaxial lines and various types of strip lines), or those used in the dominant mode, if the principal mode does not exist (for example, wave guides of the rectangular or circular type).

Since however, it is thought that the device holds a particular interest for the lowest part of the scale of the microwave frequencies, for which the so-called wave guides (rectangular or circular), in which the principal mode cannot be propagated, become difficult to use because of their considerable size, while it is normal to use lines in the principal or TEM mode which permit small dimensions and good compactness, but can be used less readily than the foregoing in non-reciprocal circuits, there are considered, by way of example, only those constructions of the invention employing lines of this last type.

To facilitate understanding the operation of the device, reference will be made first of all to the already known fact that it is possible to obtain a circulator from any symmetrical junction between several transmission lines by inserting opportunely in the said junction, and without altering its symmetrical characteristics, a piece of ferrimagnetic material having special anisotropic characteristics, such as for example those materials known by the name of ferrites, or any garnet of rare earth, if magnetized appropriately by a static external magnetic field.

Among the symmetrical junctions for several transmission lines, there have been considered up to the present time, the so-called "turnstile" junction (1), (2) between $n$ transmission lines (or the symmetrical star junction), and in particular the X junction between four lines (3) and the Y junction between three lines (4), (5), (6), (7).

(1) P. J. Allen: "The Turnstile Circulator," "IRE Transactions on Microwave Theory and Techniques," volume MTT-4, page 223, October 1956.
(2) B. A. Auld: "The Synthesis of the Symmetrical Wave Guide Circulator," "IRE Transactions on Microwave Theory and Techniques," volume MTT, page 238, April 1959.
(3) S. Yoshida: "The X Circulator," "Proceedings of the IRE," volume 47, page 1150, June 1959.
(4) M. H. Sirvetz: "The Y-Junction Microwave Circulator," Raytheon Company, Waltham, Mass., "Technical Memorandum T-143," March 1959.
(5) U. Milano, J. H. Saunders, L. Davis: "A Y-Junction Strip Line Circulator," "IRE Transactions on Microwave Theory and Techniques," volume MTT-8, page 346, May 1960.
(6) S. Yoshida: "Strip Line Y Circulator," "Proceedings of the IRE," volume 48, No. 7, page 1337, July 1960.
(7) S. Yoshida: "J-band Strip-Line Y Circulator," "Proceedings of the IRE," volume 48, No. 9, page 1664, September 1960.

The principle of operation of the circulators made from these particular types of symmetrical junctions may be readily understood by keeping in mind that it may be shown that a wave arriving at one of the terminals of the junction can always be decomposed into several waves, each of which, at the center of the junction, has only the components of the electromagnetic field either parallel with the axis of the said junction, or lying in the plane orthogonal to the said axis, but polarized circularly and rotating in one direction or the other. It is clear that the insertion of a cylinder of ferrimagnetic material along the axis of the junction, if magnetized parallel with the said axis, will change the action of the said junction to a different mode for each of these component waves of the incoming wave, determining the appearance of a nonreciprocal operation.

It should be noted however, that the zone of circular polarization is very limited, and that it coincides only with the axis of the said junction. This results necessarily therefore in a limited effectiveness of the non reciprocal material inserted, which does not readily permit obtaining by its presence alone, and working sufficiently far from the gyromagnetic resonance of the said material, the achievement of sufficiently small losses, so that the junction will act like a circulator. To this end, it is necessary to increase the effectiveness of the material with appropriate adapter members, which have the object of increasing the intensity of the magnetic field of the wave along the axis. These members therefore end up essentially by creating, at the desired frequency, a resonance in the junction which necessarily results in limiting the effective operating band of the circulator, which is consequently quite limited (a few percent) in the devices realized up to the present (5), (6), (7). Furthermore, the increase in the cross section of the anisotropic material is not very effective beyond a certain limit, inasmuch as it involves the invasion of zones of the junction increasingly farther from the axis of the same, and in which therefore, the polarization of the transverse magnetic field of the involved component of the electromagnetic wave becomes ever farther removed from a circular polarization.

To obviate this difficulty, it is proposed to make the said junction in such a way as to extend at will the zone of circular polarization that can exist in a symmetrical junction, and therefore, the effectiveness of the anisotropic material in creating phenomena of non-reciprocity. This invention proposes precisely to this end, to effect the junction between the $n$ transmission lines, not directly between them, as in the star (or "turnstile") junction, and in particular in the X or Y junctions, but through the medium of an enclosed region of the electromagnetic field made up of $n$ parallel transmission lines symmetrically disposed around an axis parallel to them; they are coupled in a uniform and equal manner among themselves, and are each connected in orderly manner to one of the $n$ lines at one end, and appropriately terminated at the other. The piece of ferrimagnetic material is still placed in correspondence with the axis and magnetized in this direction.

By way of example to illustrate this conception, reference will be made to the simplest case of a junction between three transmission lines (that is, to the case of a three port circulator).

The invention will be described with reference to the appended schematic drawings, offered solely by way of a representative example, and in which.

Figure 1:
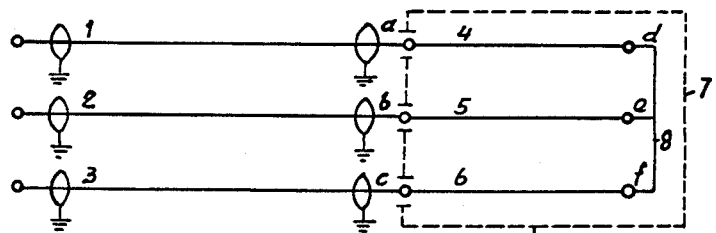
FIGURE 1 shows a symmetrical and purely reactive three line junction with the ends connected together.
Figure 2:
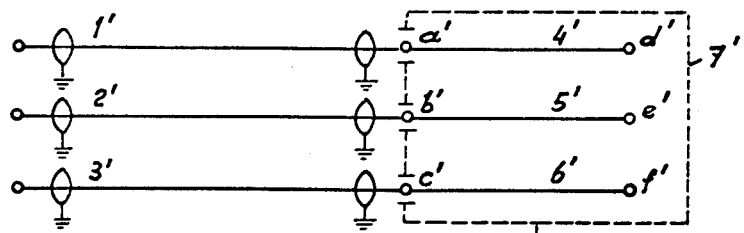
FIGURES 2 and 3 are analogous representations of a symmetrical and purely reactive three line junction with the ends respectively left open or short circuited by connecting the extremity to the external shield.
Figure 3:
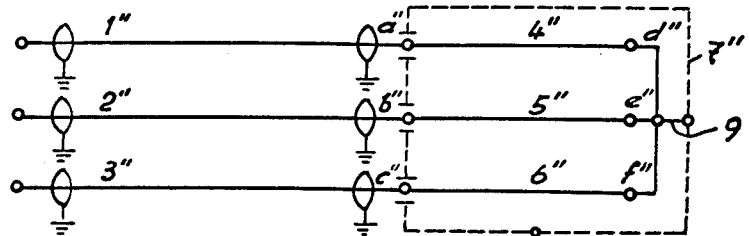
Figure 4:
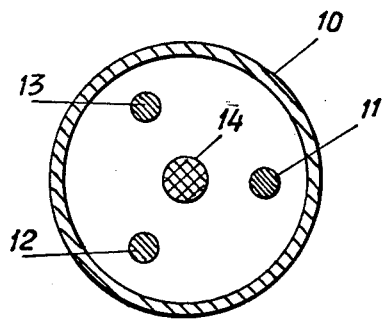
FIGURES 4, 5 and 6 illustrate in transverse section three different constructional solutions for an area of the junction.

With reference to the FIGURE 1, at 1, 2, 3 are indicated the three shielded transmission lines connected to the junction (for example, three coaxial lines or three shielded strip lines) of a characteristic impedance $Z_c$. At 7 is indicated generically the closed metallic surface delimiting the region of space conventionally called the junction, while 4, 5, 6 indicate the three equal and symmetrically disposed transmission lines internal to the junction and coupled together. The surface 7 acts as an external shield for these three lines. The three lines 4, 5, 6 are each connected in order at $a$, $b$, $c$ to one of the external lines 1, 2, 3, and in the figure they are terminated at the other end $d$, $e$, $f$, by simply connecting them together through the connection 8. However, other types of terminations may be imagined for this end, provided they are symmetrical and purely reactive, such as that of the FIGURE 2 for example, in which the said lines are simply left open, or that of the FIGURE 3 in which they are short circuited by connecting them to the external shield by means of the connection 9. FIGURES 2 and 3 are merely illustrations of other types of terminations, which as FIG. 1, are also symmetrical and purely reactive. In the FIGURES 2 and 3 the parts corresponding to those of the FIGURE 1 are characterized by the same reference symbols, provided respectively with one or two prime marks. Examples of the construction of this junction region illustrated schematically in FIGS. 1, 2 and 3 are shown in the FIGURES 4, 5 and 6. In the FIGURE 4 the region is enclosed by an external cylindrical metallic conductor 10, and the three lines 11, 12 and 13 are cylindrical conductors symmetrically disposed about the axis of the external conductor in correspondence with which is a cylinder 14 of ferrimagnetic material (ferrite or garnet) suitably magnetized along the axis by an external static field.

Figure 5:
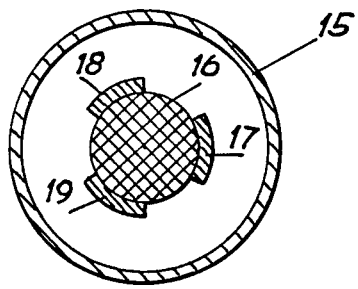

In FIGURE 5 the region is still enclosed by an external cylinderical metallic conductor 15, and the cylindrical ferrite 16 is in correspondence with the axis of this cylinder. This time however, the conductors of the three lines 17, 18 and 19 are in the form of strip lines with a cross section in an arc of a cylinder. External coaxial cables may be connected to the three lines 17, 18 and 19 in a similar manner as the structure of FIG. 7.

Figure 6:
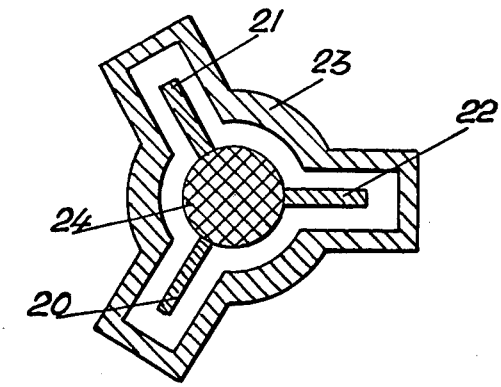

In FIGURE 6 is shown an arrangement which employs flat strip lines 20, 21 and 22 in a space with an outline 23 formed of a circular member equipped with three radial projections corresponding to the three lines. The cylindrical ferrite is indicated at 24.

Figure 7:
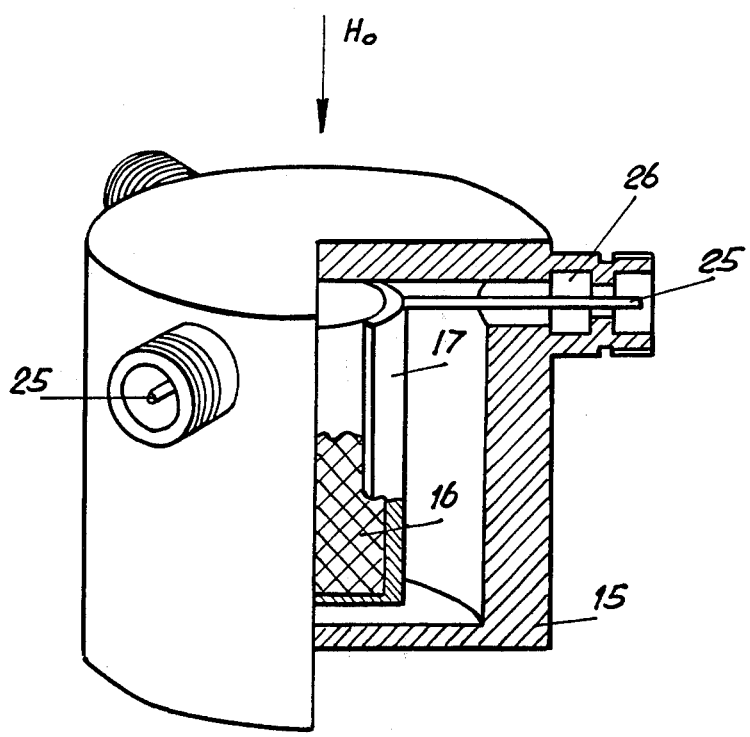
FIGURE 7 is a perspective drawing, partly in section, of a circulator of the type shown in FIGURE 5.

The FIGURE 7 shows in perspective, partly sectionalized, an example of a practical realization of a circulator, employing the particular construction of FIGURE 5, and with input connectors in the form of coaxial lines. In the FIGURE 7 the parts corresponding to those of the FIGURE 5 are characterized by the same reference symbols. The designation $H_o$ indicates the axis of magnetization; the external terminals of the lines are indicated at 25; while 26 is the insulating support for the same terminals.

To understand the operation of the above described circuit, and limiting ourselves always for the sake of simplicity to the case of a three port circulator, it should be recalled first of all (4) (5) that the diffusion matrix for this junction:

$$S = \begin{Vmatrix} S_{11} S_{12} S_{13} \\ S_{21} S_{22} S_{22} \\ S_{31} S_{32} S_{33} \end{Vmatrix} \quad (1)$$

by the hypothesis of symmetrical stations, should have:

$$S_{11} = S_{22} = S_{33} = S'$$
$$S_{12} = S_{23} = S_{31} = S''$$
$$S_{13} = S_{21} = S_{32} = S'''$$

and that is to be of the type:

$$S = \begin{Vmatrix} S' & S'' & S''' \\ S''' & S' & S'' \\ S'' & S''' & S' \end{Vmatrix}$$

This junction, as is known (4) (5), and as may be easily vertified because the matrix must be unitary, acts like a circulator if the condition $S' = 0$ (necessary and sufficient) is met; this condition has the significance that the coefficient of reflection presented by each of the terminal lines should be null when the others are closed on their characteristic impedances.

It is therefore sufficient to satisfy these conditions for the junction thus constructed to be a circulator.

The calculation of the coefficient of reflection presented by the junction at any terminal is easy enough if it is noted that in such coupled lines are three possible modes of propagation, all operating in the principal mode.

The first (to which we will give the name of balanced mode) is characterized by having the currents in the three lines equal in magnitude and phase, and consequently, the voltages between the three said lines and the external shield also equal in magnitude and phase. The second (to which we will give the name of right hand mode) is characterized by having the currents in the three lines out of phase with one another by 120 degrees in such a way that an observer who is looking in the direction of propagation sees the currents in the different lines reach their maximum according to a right hand sequence. The third mode (which we will call the left hand mode) is also characterized by having the currents in the three lines out of phase by 120 degrees, but in such a way that the observer sees the currents in the different lines reach their maximum according to a left hand sequence.

With the balanced mode goes a characteristic impedance $Z_p$ and a propagation constant $\beta_p$; with the right hand mode goes a characteristic impedance $Z_d$ and a propagation constant $\beta_d$; and with the left hand mode goes a characteristic impedance $Z_s$ and a propagation constant $\beta_s$.

If the three lines are equal and symmetrically disposed, in correspondence with the axis of symmetry, the vectors of the magnetic fields generated separately by the currents flowing in the three conductors should lie in the plane orthogonal to the said conductors, and have a direction of rotation of 120 degrees from each other. In the case of the balanced mode, they should also be in phase, and therefore give a null resultant on the axis. In the case of the other two modes, the currents being equal and out of phase in time by 120 degrees, these will give rise to an aggregate component of the magnetic field on the axis which is not null, and is rotating in the clockwise direction for the right hand mode and in the anticlockwise direction for the left hand mode, for the observer who is looking in the direction of propagation. In correspondence with the axis there is therefore, a zone of circular polarization for these last two modes. In the absence of any ferrimagnetic material, by symmetry, $Z_s$ and $Z_d$ should be equal, and thus also $\beta_s$ and $\beta_d$; the values of these assumptions in this case will be indicated respectively by $Z_{do}$ and $\beta_{do}$. We will in addition, indicate by $Z_{po}$ and $\beta_{po}$, the values always assumed in this case respectively by $Z_p$ and $\beta_p$.

In the particular case involving a TEM wave, the relation $\beta_{do} = \beta_{po} = \beta_o$ should also be present, $\beta_o$ being the intrinsic propagation constant of the medium.

The insertion of a cylinder of ferrimagnetic material magnetized longitudinally in correspondence with the axis, alters very little the values of the characteristic impedance and of the propagation constant, for the balanced mode. It does however, alter more profoundly and in a different way, the propagation constant of the other two modes, inasmuch as the characteristics of the material thus magnetized by a right or a left hand circular polarization are different, as is known.

Figure 8:
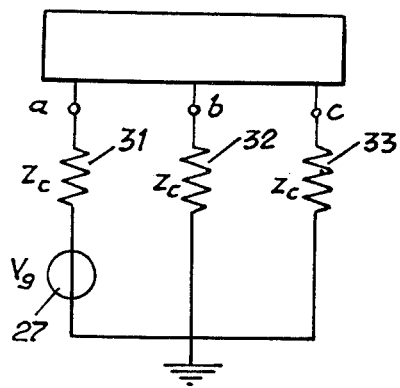
FIGURES 8 and 9 show schematically, a junction with the application of a generator to one of the terminals (FIGURE 8), and with three generator ternaries, one ternary for each of the terminals (FIGURE 9).
Figure 9:
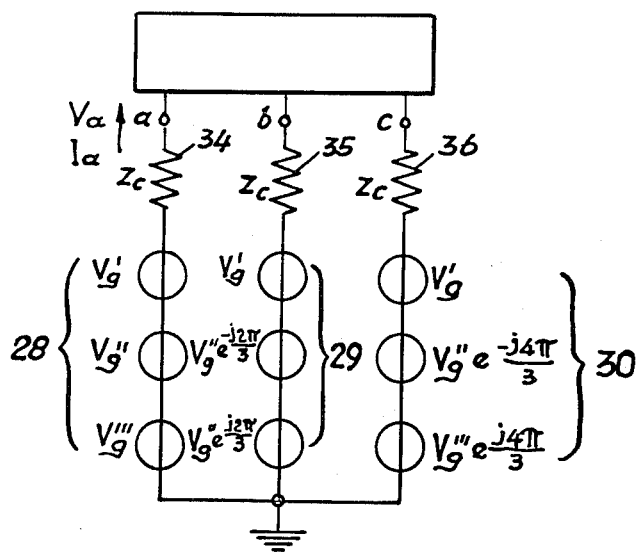

The determination of the total coefficient of reflection presented at one of the terminals could be effected in quite a simple manner by noting that the application of a generator 27 to one of the terminals of the junction, for example, to the terminal $a$ as shown in FIGURE 8, should excite all three possible modes of propagation previously described on the inside of the junction, in the group of three coupled lines. It may be observed in fact, that the generator of the FIGURE 8 can be broken down as shown in FIGURE 9, to three generator ternaries, 28, 29, 30, the first of which excites the balanced mode, while the other two excite the right hand and left hand modes. This then gives (since by symmetry $$V'_G = V''_G = V'''_G = V_G/3):$$

$$V_G = V'_G + V''_G + V'''_G$$

$$0 = V'_G + V''_G e^{-j\frac{2\pi}{3}} + V'''_G e^{j\frac{2\pi}{3}}$$

$$0 = V'_G + V''_G e^{-j\frac{4\pi}{3}} + V'''_G e^{j\frac{4\pi}{3}} \quad (2)$$

If we call $I_a$ the incoming current at the terminal $a$, and $V_a$ the voltage at this terminal, the input impedance of the junction at this terminal is:

$$Z_{ia} = \frac{V_a}{I_a} = \frac{V_G - Z_c I_a}{I_a} \quad (3)$$

and the sought coefficient of reflection $\Gamma$ is:

$$\Gamma = \frac{Z_{ia} - Z_c}{Z_{ia} + Z_c} = \frac{V_a - Z_c I_a}{V_G} = \frac{V'_a - Z_c I'_a}{V_G} + \quad (4)$$

$$\frac{V''_a - Z_c I''_a}{V_G} + \frac{V'''_a - Z_c I'''_a}{V_G}$$

$$\Gamma = \frac{1}{3}[\Gamma' + \Gamma'' + \Gamma''']$$

the coefficients of reflection for the three possible modes of propagation being:

$$\Gamma' = \frac{V'_a - Z_c I'_a}{V'_G} = \frac{Z_{ip} - Z_c}{Z_{ip} + Z_c}$$

$$\Gamma'' = \frac{V''_a - Z_c I''_a}{V''_G} = \frac{Z_{id} - Z_c}{Z_{id} + Z_c} \quad (5)$$

$$\Gamma''' = \frac{V'''_a - Z_c I'''_a}{V'''_G} = \frac{Z_{is} - Z_c}{Z_{is} + Z_c}$$

Since the termination of the three coupled lines is assumed purely reactive, the three coefficients of reflection should have a unitary modulus:

$$\Gamma' = e^{j\phi'}; \quad \Gamma'' = e^{j\phi''}; \quad \Gamma''' = e^{j\phi'''}$$

As mentioned previously the junction will act like a circulator if the coefficient of reflection presented by each of the terminal lines is a null when the others are closed on their characteristic impedances. The coefficients of reflection for each mode being equal in magnitude, we need only allow their phases to differ respectively by 120° in order for $\Gamma$ to be a null.

This can be seen by the relationship $$\Gamma = /\Gamma_1/e^{j\phi'} + /\Gamma_2/e^{j\phi''} + /\Gamma_3/e^{j\phi'''} = 0$$

if $$/\Gamma_1/ = /\Gamma_2/ = /\Gamma_3/ \text{ and } \phi', \phi'', \phi'''$$

differ respectively by 120°. The effect of the spacing of the phase of the signals in the three mode configuration explanation of the operation of a circulator is well known and may be found for example in reference (4) and (5).

If the reference section selected coincides with the initial one for the three coupled lines, we have in particular, for a terminaton like that indicated in the FIGURE 1, an open circuit at one end for the balanced mode and a short circuit for the right and left hand modes. The termination is equivalent to an open circuit for the balanced mode because the three conductors are at the same potential with respect to the external screen.

Since for the other two modes the currents in each conductor are equal in magnitude, but 120° out of phase, the total return current from the conductors to the external screen is zero, and therefore a return conductor to the screen is not necessary. Thus the termination of FIG. 1 is equivalent to the short circuit of FIG. 3 for these two modes.

$$\varphi' = -2 \arctan\left(-\frac{Z_p}{Z_c} \cot \beta_p^1\right)$$

$$\varphi'' = -2 \arctan\left(\frac{Z_d}{Z_c} \tan \beta_d^1\right) \quad (6)$$

$$\varphi''' = -2 \arctan\left(\frac{Z_s}{Z_c} \tan \beta_s^1\right)$$

In the case of the FIGURE 2, since the lines are open at one end for all three modes of propagation, we would have instead, for example:

$$\varphi' = -2 \arctan\left(-\frac{Z_p}{Z_c} \cot \beta_p^1\right)$$

$$\varphi'' = -2 \arctan\left(-\frac{Z_d}{Z_c} \cot \beta_d^1\right) \quad (7)$$

$$\varphi''' = -2 \arctan\left(-\frac{Z_s}{Z_c} \cot \beta_s^1\right)$$

In the case of the FIGURE 3, since the lines are terminated in a short circuit for all three modes, we would have:

$$\varphi' = -2 \arctan\left(\frac{Z_p}{Z_c} \tan \beta_p^1\right)$$

$$\varphi'' = -2 \arctan\left(\frac{Z_d}{Z_c} \tan \beta_d^1\right) \quad (8)$$

$$\varphi''' = -2 \arctan\left(\frac{Z_s}{Z_c} \tan \beta_s^1\right)$$

To ensure therefore, that the junction described will be a circulator at a certain frequency, it is sufficient to design the said junction by choosing appropriate values of 1, $Z_p$, $Z_d$, $Z_s$, $\beta_p$, $\beta_d$, and $\beta_s$, and taking into account, for the possible values of these parameters, the presence of a selected cylinder of ferrimagnetic material in correspondence with the axis of symmetry of the three lines, and magnetized in this direction, this selection being made so as to cause the angles $\varphi'$, $\varphi''$, $\varphi'''$ to differ among themselves by 120 degrees at the desired frequency.

In the FIGURES 8 and 9, the impedances connected to the terminals of the circulator, and indicated at 31, 32, 33 and 34, 35, 36, are of a value equal to the characteristic impedance of the lines of access to the said circulator.

Since the equations which follow are less in number than those of the parameters at our disposal, it is possible to take advantage of this fact to obtain a device with a very broad band width. In order for the junction to retain its properties of a circulator also, for the frequencies around the one for which it was particularly designed, it is necessary that $\varphi'$, $\varphi''$ and $\varphi'''$ vary by the same amount as the frequency varies.

Hence, the most immediate manner of obtaining a broad band width is therefore that of requiring equality of the three derivations:

$$\frac{\gamma\varphi'}{\gamma\omega} = \frac{\gamma\varphi''}{\gamma\omega} = \frac{\gamma\varphi'''}{\gamma\omega} \qquad (9)$$

Another road that may be followed to achieve the same result, and in practice obtaining an even greater band width, is that of requiring that the three phases $\varphi'$, $\varphi''$ and $\varphi'''$ differ by 120 degrees not only for the middle frequency selected, but also for two other frequencies, one higher than the middle frequency and the other lower.

To obtain the desired result more easily, it may be convenient to have at one's disposal in the design, another parameter which can be varied at will.

Figure 10:
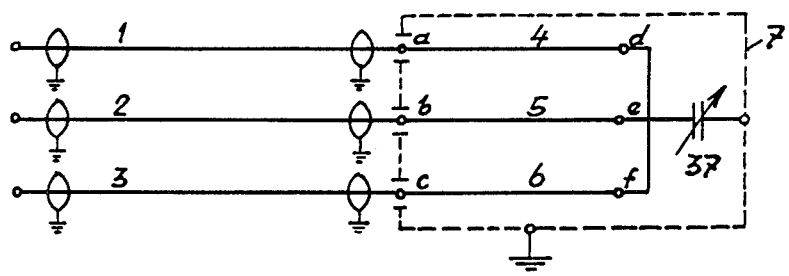
FIGURE 10 shows schematically a three line junction with the insertion of a terminal capacitance.

By way of example, it is shown in FIGURE 10 how this may be accomplished by the insertion of a terminal capacitance 37 in a junction similar to that of the FIGURE 1, the reference symbols of which are repeated. In this case, the said capacitance exists only for the balanced mode, since for the other two modes the lines always remain short circuited at their extremity, and the Equations 6 become respectively:

$$\varphi' = -2 \arctan\left(\frac{Z_p}{Z_0} \frac{\omega C Z_p \tan \beta_p l - 1}{\omega C Z_p + \tan \beta_p l}\right)$$

$$\varphi'' = -2 \arctan\left(\frac{Z_d}{Z_0} \tan \beta_d l\right)$$

$$\varphi''' = -2 \arctan\left(\frac{Z_s}{Z_0} \tan \beta_s l\right) \qquad (10)$$

Figure 11:
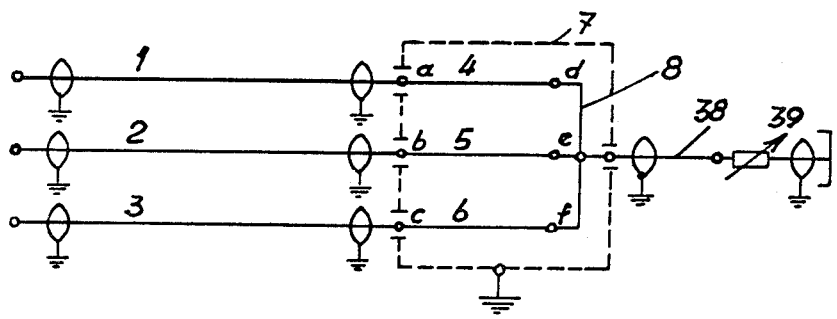
FIGURE 11 shows schematically a three line junction with a common terminal connected to a line of appropriate length and impedance.

In the FIGURE 11, always by way of example, it is shown how this result may also be obtained, if in the circuit of the FIGURE 1, the three coupled lines 4, 5, 6, together with the common termination 8, are coupled to a single line 38 of an appropriate length and characteristic impedance 39. It is evident that only the balanced mode can be propagated over this new line. In this way it is possible to obtain, not only the desired value of the angle $\varphi'$, but also the desired relationship with the frequency of the said angle.

Besides the examples given, other similar schemes may be imagined for obtaining this enlargement of the band width, by those skilled in the art, without departing from the spirit in which the said scheme itself has been presented, nor from that of the invention.

In any event, it will be readily understood how the various embodiments described are illustrative of any of the possibilities and specific structural configurations which may represent an application of the principles of the invention. Various other embodiments could be found by those skilled in the art, in accordance with the principles described, without departing from the spirit and the scope of the invention.

What is claimed is:

1. A non-reciprocal electromagnetic wave transmission line junction comprising:
   at least three transmission lines, each having inner and outer conducting elements,
   an elongated member of ferrimagnetic material having a longitudinal axis defining the axis of said junction,
   at least three conductors of equal length, each having a first and a second end, said conductors arranged symmetrically about said longitudinal axis, parallel and adjacent to said ferrimagnetic material, and electromagnetically coupled substantially throughout their length, each of said conductors' first ends connected to the inner conducting element of the corresponding transmission line,
   a conducting shield surrounding said conductors and ferrimagnetic material and connected to the outer conducting elements of said transmission lines,
   means including said shield for reactively terminating said conductors' second ends,
   said ferrimagnetic material magnetically biased in a direction parallel to said longitudinal axis so as to cause energy supplied to one of said conductors to be coupled in a non-reciprocal manner to a specific other of said conductors in cyclic order.

2. A non-reciprocal electromagnetic wave transmission line junction as claimed in claim 1, wherein said conductors are the center conductors of strip transmission lines having inner surfaces immediately adjacent to, and curved in conformance with, an outer surface of said ferrimagnetic material.

3. A non-reciprocal electromagnetic wave transmission line junction as claimed in claim 1, wherein said means for reactively terminating said conductors' second ends also includes a conducting member interconnecting said second ends of said conductors.

4. A non-reciprocal electromagnetic wave transmission line junction as claimed in claim 3, wherein said conducting member is connected to said conducting shield.

5. A non-reciprocal electromagnetic wave transmission line junction as claimed in claim 3, wherein said means for reactively terminating said conductors' second ends also includes a variable capacitance connecting said conducting member to said conducting shield.

6. A non-reciprocal electromagnetic wave transmission line junction as claimed in claim 3, wherein said means for reactively terminating said conductors' second ends also includes a single transmission line of variable characteristic impedance, said line being disposed externally of said conducting shield and one end thereof being connected to said conducting member through an aperture in said conducting shield.

References Cited by the Examiner

UNITED STATES PATENTS

| | | | |
|---|---|---|---|
| 2,234,234 | 3/1941 | Cork | 333—26 |
| 2,885,640 | 5/1959 | Rowen | 333—26 |
| 2,913,678 | 11/1959 | Fox | 333—1.1 |
| 3,022,470 | 2/1962 | Oliner | 333—11 |
| 3,063,024 | 11/1962 | Davis | 333—11 |

HERMAN KARL SAALBACH, *Primary Examiner.*